United States Patent
Leermakers

(10) Patent No.: US 9,158,523 B2
(45) Date of Patent: *Oct. 13, 2015

(54) SYSTEM FOR BROADCASTING SOFTWARE APPLICATIONS AND PORTABLE DATA COMMUNICATIONS DEVICE FOR USE IN SUCH A SYSTEM

(75) Inventor: Rene Leermakers, D.N. Shomron (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1076 days.

This patent is subject to a terminal disclaimer.

(21) Appl. No.: 10/993,391

(22) Filed: Nov. 19, 2004

(65) Prior Publication Data

US 2005/0090246 A1    Apr. 28, 2005

Related U.S. Application Data

(63) Continuation of application No. 09/430,536, filed on Oct. 29, 1999, now Pat. No. 6,928,468.

(51) Int. Cl.
*G06F 15/16* (2006.01)
*G06F 9/445* (2006.01)
*H04L 29/08* (2006.01)

(52) U.S. Cl.
CPC *G06F 8/61* (2013.01); *H04L 67/04* (2013.01); *H04L 67/325* (2013.01); *H04L 67/34* (2013.01); *H04L 69/329* (2013.01)

(58) Field of Classification Search
USPC ......... 709/203, 217–219, 221–222, 245, 224; 455/428, 899
See application file for complete search history.

(56) References Cited

U.S. PATENT DOCUMENTS 5,579,367 A * 11/1996 Raymond et al. ............. 455/418
5,689,245 A    11/1997 Noreen et al. ........... 340/825.49

(Continued)

FOREIGN PATENT DOCUMENTS

JP    7107056 A    4/1995
(Continued)

OTHER PUBLICATIONS

Tsuji, Junichiro et al "Proposal for Transfer Error Recovering on Broadcasting Network" 1999.
(Continued)

*Primary Examiner* — El Hadji Sall

(57) ABSTRACT

A communications system consisting of a server system that stores software applications, a broadcast system that broadcasts the software applications, and a multiplicity of portable clients that each include a receiver having a tuner that is selectively tunable to receive a selected one of the software applications broadcasted by the broadcast system. The portable clients can be any type of portable data communications device, such as a hand-held, palm-top, or notebook computing device, a PDA, an intelligent cellular phone, or any other personal multimedia appliance or Network Computer (NC). The broadcast system can be any suitable satellite or terrestrial air or cable broadcast system. For example, a CATV broadcast network, a DBS broadcast network, an HDTV broadcast network, or other appropriate broadcast network could be utilized. The software applications can consist of a broad spectrum of different software applications, such as word processing, video games, spreadsheets, address books, calendars, and the like. Each of the portable data communications devices includes a receiver that has a tuner that is selectively tunable to receive a selected one of a plurality of software applications broadcasted by a broadcast system, a user-interface that enables a user to select one of the broadcasted software applications for downloading, a processor for executing the downloaded software applications, and a modem for establishing a two-way communications link with a network control system. The two-way communications link includes a forward channel over which the portable data communications device can transmit client data to the network control system, and a return channel over which the network control system can transmit system data to the portable data communications device. The client data can include requests for unrecoverable software application data and client software download request data. The system data can include instructions for supervising the downloading of software applications, unrecoverable software application data, and download control data issued in response to the client software download request data. In one embodiment, the broadcast system broadcasts the software applications over different channels each occupying a different respective frequency band, and the tuner is selectively tunable to any selected one of the plurality of different frequency bands in order to receive the selected one of the broadcasted software applications.

26 Claims, 2 Drawing Sheets

(56) References Cited

U.S. PATENT DOCUMENTS

| | | | |
|---|---|---|---|
| 5,734,589 A * | 3/1998 | Kostreski et al. | 715/716 |
| 5,832,030 A * | 11/1998 | Tzannes et al. | 375/260 |
| 5,978,855 A * | 11/1999 | Metz et al. | 709/249 |
| 6,192,403 B1 * | 2/2001 | Jong et al. | 709/224 |
| 2001/0034230 A1 | 10/2001 | Okada | |

FOREIGN PATENT DOCUMENTS

| | | | | |
|---|---|---|---|---|
| JP | 08162909 A | 6/1996 | | H03J 5/02 |
| JP | 8213962 A | 8/1996 | | |
| JP | 11098280 A | 4/1999 | | |
| JP | 11146362 A | 5/1999 | | |
| JP | 11274997 A | 10/1999 | | |
| WO | 9737463 A1 | 10/1997 | | |
| WO | 9933076 A1 | 1/1999 | | |

OTHER PUBLICATIONS

Bunsuke Oshita, "Utilization of Information Highway Entertainment", IEICE, Apr. 25, 1995.

* cited by examiner

SYSTEM FOR BROADCASTING SOFTWARE APPLICATIONS AND PORTABLE DATA COMMUNICATIONS DEVICE FOR USE IN SUCH A SYSTEM

This application is a Continuation of U.S. patent application Ser. No. 09/430,536 filed on Oct. 29, 1999 now U.S. Pat. No. 6,928,468 which claims priority to an application entitled "System for Broadcasting Software Applications and Portable Data Communication."

BACKGROUND OF THE INVENTION

The present invention relates generally to the field of data communications, and more particularly, to the field of portable data communications devices.

The recent explosive growth of the Internet has given rise to the concept of "Network Computing". The basic idea of Network Computing is to store data and software applications on remote computers ("servers") rather than locally on user's computers ("clients"), with the clients only downloading the data and/or software applications from a server(s) on which they reside, as they are needed, thus dispensing with or greatly minimizing the client's memory and hard-disk drive resources. The clients in this Network Computing paradigm are sometimes referred to as "Network Computers" (NCs), or "thin clients". Ideally, all software applications and user data would be stored in secure, fault-tolerant, scalable servers and associated mass storage devices (e.g., Redundant Arrays of Inexpensive Drives—RAIDs), thereby completely eliminating the need for individual computer users to purchase, install, maintain, upgrade, and replace individual software applications and/or operating systems, and completely eliminating the need for individual computer users to store and back-up their data files.

Many, including large companies such as Oracle, Sun Microsystems, and IBM, have promoted a particular instantiation of this "network centric" paradigm in which all software applications are written in the Java programming language, and served in the form of Java "applets", to thereby enable real-time execution of any selected software application on any type of computer (mainframe, PC, laptop, etc.) running on any type of computer platform or operating system (e.g., Microsoft Windows, Apple Macintosh, Unix, etc.). In short, each client would be "Java-enabled", and could thus be regarded as a "Java virtual machine". Since Java is an open, hardware-independent, cross-platform ("open") programming language, the result would be that all clients would be capable of executing any software application. This "universal" client-server model is now regarded by many as the "holy grail" of the computing world.

Ideally, the user should be unaware that he/she is not working with a computer having little or no local storage and no resident software applications. However, this is only possible if the client has a continuous, broadband connection to the network (e.g., a private Intranet and/or the public Internet). While this is feasible in some professional and commercial settings, it is not generally feasible for the average home user/personal consumer. The typical PC user only has a narrowband connection, via telephone modem, to the Internet.

Moreover, recent dramatic technological advancements in the fields of computers, software, semiconductors, and communications have led to a proliferation of products that are capable of real-time processing of digitized streams of multiple data types, such as audio, video, graphics, and communications data streams. Such products are commonly referred to as "multimedia products". These multimedia products include PCs, television set-top boxes, videoconferencing systems, Internet (Web) Browsers, video arcade game systems, consumer video game consoles, and many others. In general, the downloading of multimedia content and software applications demands ever-increasing amounts of bandwidth.

Moreover, there is a pronounced trend towards a convergence of these various multimedia data types, leading to an increased level of integration of multimedia processing capabilities in multimedia products. Further, there is an increasing consumer demand for "personal multimedia products" or "personal multimedia appliances" which are portable (mobile/transportable), and which preferably have at least a wireless mode of operation. Present-generation products of this type include intelligent cellular telephones (such as Nokia's Smart Phone), Personal Digital Assistants (PDAs), such as Philips' Nino and 3Com's Palm Pilot palm-top computing devices, laptop and notebook computers, digital mobile telephony devices for use in Personal Communications Systems (PCS), and the like. Typically, such hand-held devices are equipped (or can be equipped) with a wireless (and/or wireline) modem that enables the user to dial up a narrowband connection to an Integrated Services Digital Network (ISDN), a Public Switched Telephone Network (PSTN), a cellular telephone data network, such as the Cellular Digital Packet Data (CDPD) network, or the like, to enable the user to send and receive e-mail, and/or to surf the Web. In order to run software applications like word processing, video games, spreadsheets, address books, calendars, and the like, these hand-held devices must be equipped with a processor and sufficient memory to store and run these software applications.

It is becoming increasingly apparent that as the variety and complexity of multimedia data increases, the amount of processing power, memory resources, and communications bandwidth that will be required to transmit and to process this data and to run multimedia software applications will also increase. Inevitably, the line of distinction between a "computer" on the one hand, and a "personal multimedia appliance", on the other hand, will completely blur.

It is also becoming increasingly apparent that the amount of communications bandwidth available to personal multimedia appliances, such as hand-held, palm-top, and notebook computing devices, PDAs, and intelligent cellular phones, is much too narrow to enable the real-time downloading and execution of such software applications in accordance with the Network Computing paradigm.

However, there is an increasing consumer demand for a personal multimedia appliance that has fully integrated multimedia processing capabilities, that is compact and inexpensive, and that has the capability to run, in real-time, a broad spectrum of different software applications, such as word processing, video games, spreadsheets, address books, calendars, and the like, while preferably also having other capabilities, such as sending and receiving e-mail, surfing the Web, receiving and playing digital video (e.g., MPEG-2 or DVD-quality video) and digital audio (e.g., MP3 or CD-quality audio), and/or cellular telephony.

The present invention fulfills the need in the art for a portable data communications device that has the capability to download and run, in real-time, a broad spectrum of different software applications, such as word processing, video games, spreadsheets, address books, calendars, and the like, while preferably also having other capabilities, such as sending and receiving e-mail, surfing the Web, receiving and playing digital video (e.g., MPEG-2 or DVD-quality video) and digital audio (e.g., MP3 or CD-quality audio), and/or cellular telephony.

SUMMARY OF THE INVENTION

The present invention encompasses, in one of its aspects, a communications system consisting of a server system that stores software applications, a broadcast system that broadcasts the software applications, and a multiplicity of portable clients that each include a receiver having a tuner that is selectively tunable to receive a selected one of the software applications broadcasted by the broadcast system. The portable clients can be any type of portable data communications device, such as a hand-held, palm-top, or notebook computing device, a PDA, an intelligent cellular phone, or any other personal multimedia appliance or Network Computer (NC). The broadcast system can be any suitable satellite or terrestrial air or cable broadcast system. For example, a CATV broadcast network, a DBS broadcast network, an HDTV broadcast network, or other appropriate broadcast network could be utilized. The software applications can consist of a broad spectrum of different software applications, such as word processing, video games, spreadsheets, address books, calendars, and the like.

Each of the portable data communications devices includes a receiver that has a tuner that is selectively tunable to receive a selected one of a plurality of software applications broadcasted by a broadcast system, a user-interface that enables a user to select one of the broadcasted software applications for downloading, a processor for executing the downloaded software applications, and a modem for establishing a two-way communications link with a network control system.

The two-way communications link includes a forward channel over which the portable data communications device can transmit client data to the network control system, and a return channel over which the network control system can transmit system data to the portable data communications device. The client data can include requests for unrecoverable software application data and client software download request data. The system data can include instructions for supervising the downloading of software applications, unrecoverable software application data, and download control data issued in response to the client software download request data.

In one embodiment, the broadcast system broadcasts the software applications over different channels each occupying a different respective frequency band, and the tuner is selectively tunable to any selected one of the plurality of different frequency bands in order to receive the selected one of the broadcasted software applications.

In another of its aspects, the present invention encompasses the portable data communications devices which are used in the communication system of the present invention.

BRIEF DESCRIPTION OF THE DRAWINGS

These and other objects, features, and advantages of the present invention will become readily apparent from the following detailed description taken in conjunction with the accompanying drawings, in which.

DETAILED DESCRIPTION OF THE INVENTION

Figure 1:
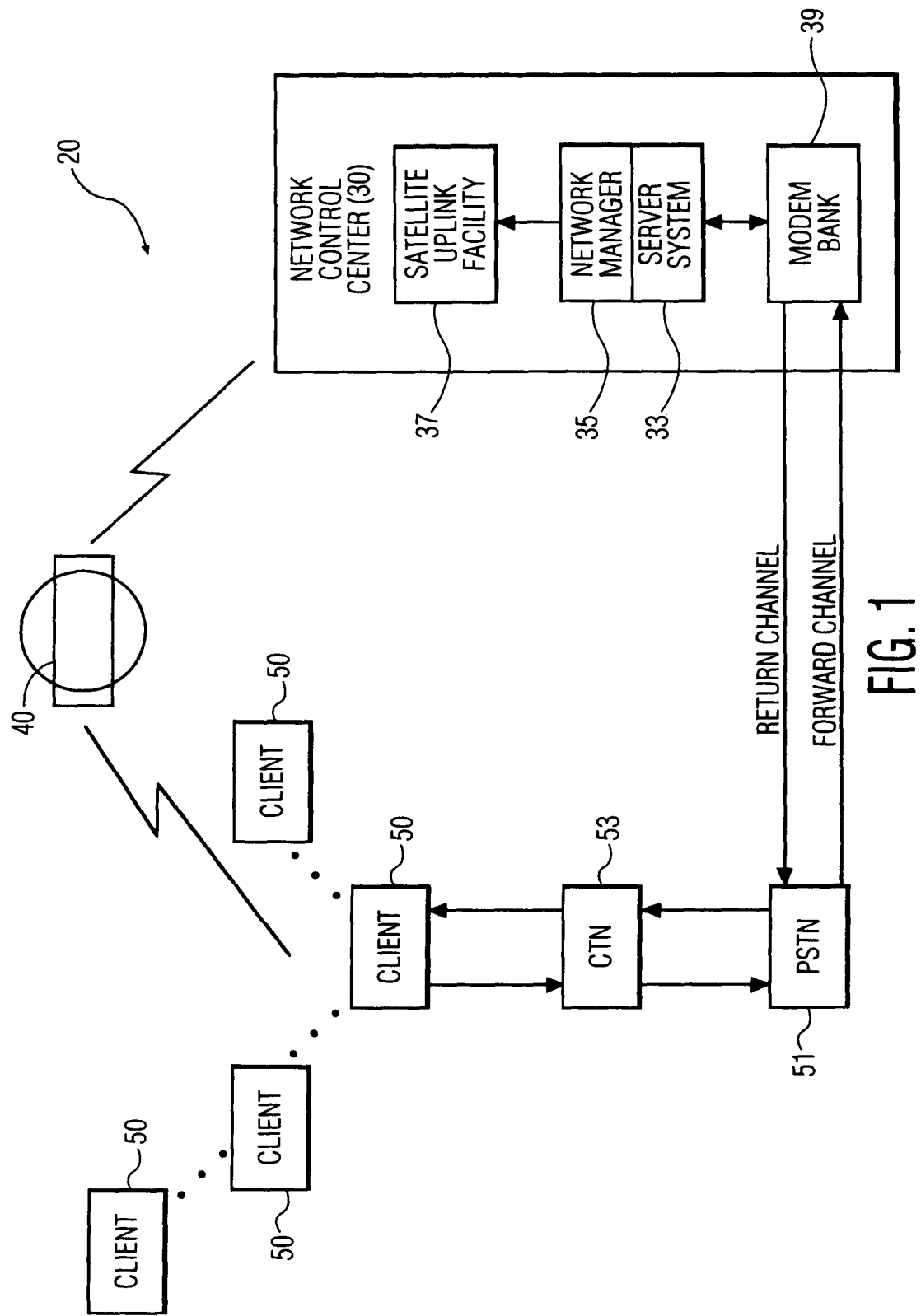
FIG. 1 is a functional block diagram of a system for broadcasting software applications that embodies one aspect of the present invention; and, FIG. 2 is a functional block diagram of a portable data communications device that embodies another aspect of the present invention.

With reference now to FIG. 1, an exemplary system 20 for broadcasting software applications that embodies one aspect of the present invention will now be described. As can be seen, the system 20 includes a Network Control Center 30, a satellite 40, and a multiplicity of clients 50. The Network Control Center 30 includes a server system 33, a Network Manager 35, a satellite uplink facility 37, and a modem bank 39. It will be readily appreciated that the various components of the Network Control Center 30 can be physically co-resident in the same facility, or can be distributed and interconnected by any suitable means, e.g., via a Local Area Network (LAN), Wide Area Network (WAN), Metropolitan Area Network (WAN), or the like.

The server system 33 functions to store a plurality of different software applications for broadcast to the multiplicity of clients via the satellite 40. The scheduling, management, and control of the storage, retrieval, and transmission of the software applications is handled by the Network Manager 35, which can suitably be a computer or computer system that is appropriately programmed and operated. The Network Manager 35 preferably supplies the software applications as a continuous data stream over at least one channel to the satellite uplink facility 37, which then modulates the data stream(s) for transmission via one or more uplink data transmission channels to the satellite 40, which in turn amplifies and broadcasts the data stream(s) via one or more downlink data transmission channels.

It will be readily appreciated by those having ordinary skill in the pertinent art and access to the teachings of the present disclosure that the number of channels dedicated for use for broadcasting software applications is not limiting to the present invention. However, it is presently contemplated that multiple channels will be utilized in order to provide sufficient communications bandwidth to enable the simultaneous broadcast of a broad spectrum of different software applications to a multiplicity of the clients 50 that are simultaneously requesting a diverse suite of software applications, such as word processing, video games, spreadsheets, address books, calendars, and the like. In this regard, as will be described hereinafter, each of the clients 50 preferably has the capability of tuning to any selected one of the plurality of different channels over which the software applications are broadcast.

In the illustrative embodiment depicted in FIG. 1, the Network Control Center 30 is equipped with a modem bank 39 that is also under the active management and control of the Network Manager 35 to thereby enable the establishment of a two-way communications link with each of the multiplicity of clients 50, as required. In the illustrative embodiment, the two-way communications link is a full duplex telephone connection, e.g., via a Public Switched Telephone Network (PSTN) 51 and a Cellular Telephone Network (CTN) 53, to each of the multiplicity of clients 50. The two-way communications link includes a forward channel that allows each client 50 to transmit user-specific data and/or requests to the Network Control Center 30, and a return channel that allows the Network Control Center 30 to transmit user-specific data and/or instructions/commands to each client 50, as required.

Figure 2:
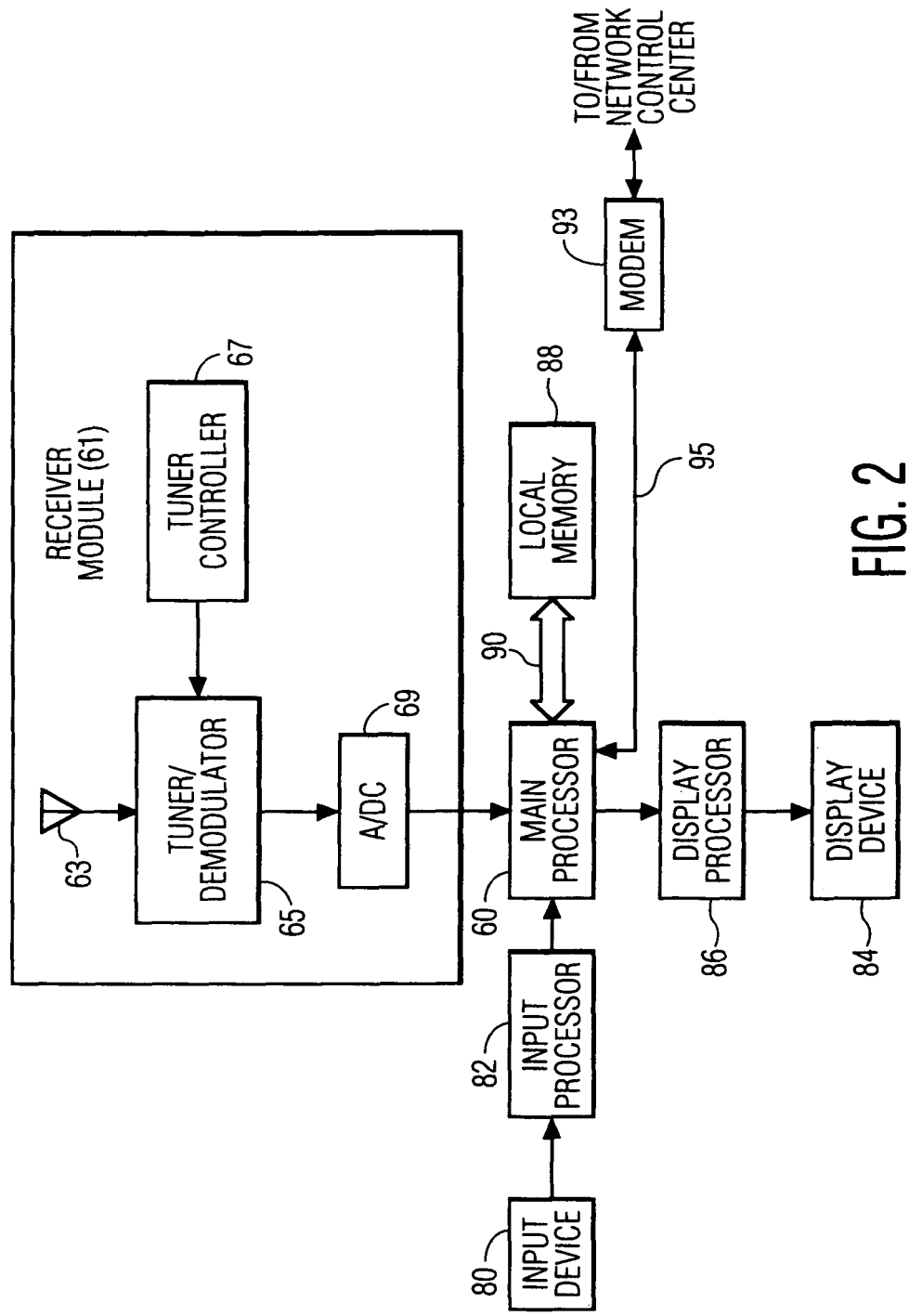

With reference now to FIG. 2, there can be seen a functional block diagram of a representative one of the clients 50. The client 50 includes a processor 60 on which resides a control program that manages and controls network communications in a manner to be described below. Preferably, the client 50 is Java-enabled, so that it can function as a Java virtual machine, although this is not limiting to the present invention, in its broadest sense. For example, the processor 60 can suitably be a multi-function, multimedia processor such as a Philips Semiconductor TriMedia programmable DSP/CPU that combines a next-generation, programmable microprocessor core with a full set of innovative development tools to simultaneously process full-motion video (e.g., MPEG-2 and DVD digital video), 3-D computer graphics, CD-quality audio, and high-speed data communications data streams. This type of processor is sometimes referred to in the art as a "system-on-a-chip".

The client 50 of the illustrative embodiment depicted in FIG. 2 also includes a receiver module 61 that includes an antenna 63, a tuner/de-modulator 65, a tuner controller 67, and an Analog-to-Digital Converter (ADC) 69. Preferably, the tuner/de-modulator 65 is selectively tunable by the tuner controller 67, which is in turn controlled by the processor 60, to any selected one of a plurality of different frequency bands/channels that correspond to the downlink data transmission channels of the satellite 40 over which the software applications originated by the Network Control Center 30 are broadcast.

The client 50 of the illustrative embodiment depicted in FIG. 2 further includes an input device 80, e.g., an illuminated keypad, and/or integrated trackpad or trackball and/or mouse and/or stylus-controlled touch-sensitive screen, or the like. The input device 80 is coupled to an input processor 82 (e.g., a DSP) that is turn coupled to the processor 60. The client 50 further includes a display device 84, such as flip-up/flip-down LCD or other Flat Panel Display (FPD). The display device 84 is controlled by a display processor 86 (e.g. a DSP) that is coupled to the processor 60. Alternatively, the input processor 82 and/or the display processor 86 can be integrated into the processor 60 (e.g., as separate function units thereof).

The client 50 of the illustrative embodiment depicted in FIG. 2 further includes a local memory 88, which can, for example, be a Synchronous Dynamic Random Access Memory (SDRAM) or the like. The local memory 88 is coupled via a bus 90 to the processor 60. The local memory 88 should be sufficient to store control data needed by the control program running on the processor 60, such as menu and related information, and to store any broadcast software applications that are downloaded.

The client 50 of the illustrative embodiment depicted in FIG. 2 further includes a modem 93 coupled via a serial bus 95 to the processor 60. The modem 93 is preferably a wireless or cellular modem, such as the IP Minstrel sold by Novatel, that is adapted to establishing a two-way communications link, such as a full duplex cellular telephone connection, e.g., via a Cellular Telephone Network (CTN) 53 and a Public Switched Telephone Network (PSTN) 51, to the Network Control Center 30. As previously described, the two-way communications link preferably includes a forward channel that allows the client 50 to transmit user-specific data and/or requests to the Network Control Center 30, and a return channel that allows the Network Control Center 30 to transmit user-specific data and/or instructions/commands to the client 50, as required.

It will be readily apparent to those having ordinary skill in the pertinent art and access to the teachings of the present disclosure that a variety of different techniques can suitably be utilized to enable a user of the client 50 to request and download one or more selected ones of the broadcast software applications, and to manage and control this process. For example, the control program can provide a menu of the software applications that are available for downloading. The menu could also provide associated information such as estimated time required to download each software application, the different categories of software applications that are available for download (e.g., word processors, video games, spreadsheets, address books, calendars, etc.), and the like.

The channel over which each software application is broadcast can be stored in a look-up table in the local memory 88, with this channel information being retrieved by the processor 60 in response to the user selecting a particular software application for download, e.g., via the input device 80. The processor 60 can then issue an appropriate control signal to the tuner controller 67 which, in response thereto, can tune the tuner/de-modulator 65 to the appropriate channel.

Alternatively, the processor 60, in response to the user selecting a particular application for download, can generate a request which can be transmitted by the modem 93 over the forward channel of the two-way communication channel to the Network Control Center 30. The Network Manager 35 within the Network Control Center 30 can then generate appropriate channel tuning instructions/commands for transmission by the modem bank 39 and via the return channel of the two-way communication channel to the client 50. The processor 60, in response to the channel tuning instructions/commands received from the Network Control Center 30, can then issue an appropriate control signal to the tuner controller 67 which, in response thereto, can tune the tuner/de-modulator 65 to the appropriate channel. Once downloaded, the software application can be stored in the local memory 88 and executed by the processor 60 in the normal manner.

As will appreciated, with broadcast bitrates of 10 megabits/second or greater, particularly with communications taking place over a noisy/lossy transmission medium (e.g., air), there is the possibility of data corruption leading to unrecoverable data, i.e., uncorrectable bit errors. In this situation, the client could wait for a re-transmission of the selected software application, or, alternatively, the two-way communications link with the Network Control Center 30 can be used to recover the missing (corrupted) data, e.g., the request for the missing data can be transmitted to the Network Control Center 30 over the forward channel and the missing data itself can be transmitted by the Network Control Center 30 over the return channel.

In general, it should be recognized that the client 50 can suitably be implemented as any type of portable data communications device, such as a hand-held, palm-top, or notebook computing device, a PDA, and an intelligent cellular phone, or any other personal multimedia appliance or Network Computer (NC). The client 50 may also be provided with one or more communications ports (e.g., USB ports) to facilitate connection to one or more external multimedia products, such as a DVD drive, a CD-ROM drive, a CD player, or the like. Also, although the illustrative embodiment of the present invention has been described above in connection with a satellite broadcast system, it should be readily apparent that any suitable terrestrial air or cable broadcast system could be utilized. For example, a CATV broadcast network, a DBS broadcast network, an HDTV broadcast network, or other appropriate broadcast network could be utilized.

Users could be charged on a time-of-usage basis, on a subscription basis (e.g., monthly or annual subscription fee), on a per application downloaded basis, on a per use/transaction basis, or any other suitable basis. In fact, the service could be offered as a free service in conjunction with other services and/or subsidized by advertisers.

Although the present invention has been described in detail hereinabove, it should be appreciated that many variations and/or modifications of the basic inventive concepts taught herein which may appear to those skilled in the pertinent art will still fall within the spirit and scope of the present invention as defined in the appended claims.

What is claimed is:

1. A communications system, comprising:
a server system that stores software applications;
a network controller to control a broadcast system having at least one communication channel and a two-way communications system, wherein the broadcast system broadcasts the software applications using the at least one broadcast channel, and the two-way system having a communication link other than the at least one communication channel, to receive/transmit client data and wherein the communication link is used to retransmit of all or portions of the software application; and
a multiplicity of portable clients that each include a receiver having a tuner that is selectively tunable to receive a selected one of the software applications broadcasted by the broadcast system and a processor for executing the downloaded software application and client data from one of the respective broadcast or two-way system.

2. The communications system as set forth in claim 1, wherein the broadcast system is a wireless broadcast system.

3. The communications system as set forth in claim 1, wherein the two-way communications link between the server system and each of the multiplicity of portable clients includes a forward channel over which the respective portable client can transmit client data to the server system, and a return channel over which the server system can transmit system data to the respective portable client.

4. The communications system as set forth in claim 1, wherein the two-way communications system of each of the portable clients is a wireless modem.

5. The communications system as set forth in claim 4, wherein the broadcast system is a satellite direct broadcast system.

6. The communications system as set forth in claim 1, wherein the broadcast system broadcasts the software applications over different channels each occupying a different respective frequency band.

7. The communications system as set forth in claim 6, wherein the broadcast system is a satellite broadcast system.

8. The communications system as set forth in claim 6, wherein the tuner of the receiver of each of the multiplicity of portable clients is selectively tunable to any selected one of the plurality of different frequency bands in order to receive one or more selected one of the software applications broadcasted by the broadcast system.

9. The communications system as set forth in claim 7, further comprising a two-way communications link between the server system and each of the multiplicity of portable clients, wherein the two-way communications link includes a forward channel over which the respective portable client can transmit client data to the server system, and a return channel over which the server system can transmit system data to the respective portable client.

10. The communications system as set forth in claim 1, wherein each of the portable clients is a portable data communications device.

11. The communications system as set forth in claim 1, wherein each of the portable clients further includes a user-interface that enables a user to select one of the broadcasted software applications for downloading, and a processor for executing the downloaded software application.

12. The communications system as set forth in claim 11, wherein:
the broadcast system broadcasts the software applications over different channels each occupying a different respective frequency band; and,
the tuner of the receiver of each of the multiplicity of portable clients is selectively tunable to any selected one of the plurality of different frequency bands in order to receive one or more selected one of the software applications broadcasted by the broadcast system.

13. The communications system as set forth in claim 12, further comprising a two-way communications link between the server system and each of the multiplicity of portable clients, wherein the two-way communications link includes a forward channel over which the respective portable client can transmit client data to the server system, and a return channel over which the server system can transmit system data to the respective portable client.

14. The communications system as set forth in claim 13, wherein the broadcast system is a satellite broadcast system.

15. The communications system as set forth in claim 13, wherein the system data includes instructions for supervising the downloading of software applications.

16. The communications system as set forth in claim 13, wherein the client data includes requests for unrecoverable software application data, and the system data includes the unrecoverable software application data.

17. The communications system as set forth in claim 13, wherein the client data includes client software download request data, and the system data includes download control data issued in response to the client software download request data.

18. A portable data communications device, comprising:
a receiver that includes a tuner that is selectively tunable to receive (1) a selected one of a plurality of software applications broadcasted by a broadcast system having at least one communication channel to broadcast the software application(s), and (2) client data and retransmission of all or portions of the software application from a two-way communication system having a communication link other than the at least one communication channel to transmit the client data, software application(s) or portions of software application(s);
a user-interface that enables a user to select one of the broadcasted software applications for downloading;
a processor for executing the downloaded software application and client data from one of the respective broadcast or two-way system.

19. The portable data communications device as set forth in claim 18, further comprising a control program executed by the processor for controlling the tuner.

20. The portable data communications device as set forth in claim 18, wherein the two-way communications link includes a forward channel over which the portable data communications device can transmit client data to the network control system, and a return channel over which the network control system can transmit system data to the portable data communications device.

21. The portable data communications device as set forth in claim 18, wherein the broadcast system is a satellite direct broadcast system.

22. The portable data communications device as set forth in claim 18, wherein the broadcast system is a satellite direct broadcast system.

23. The portable data communications device as set forth in claim 20, wherein the system data includes instructions for supervising the downloading of software applications.

24. The portable data communications device as set forth in claim 20, wherein the client data includes requests for unrecoverable software application data, and the system data includes the unrecoverable software application data.

25. The portable data communications device as set forth in claim 20, wherein the client data includes client software download request data, and the system data includes download control data issued in response to the client software download request data.

26. The portable data communications device as set forth in claim 18, wherein:
- the broadcast system broadcasts the software applications over different channels each occupying a different respective frequency band; and,
- the tuner is selectively tunable to any selected one of the plurality of different frequency bands in order to receive the selected one of the software applications broadcasted by the broadcast system.

* * * * *